(12) United States Patent
Yamazaki

(10) Patent No.: US 7,847,775 B2
(45) Date of Patent: Dec. 7, 2010

(54) ELECTRO-OPTICAL DEVICE, METHOD OF DRIVING ELECTRO-OPTICAL DEVICE, AND ELECTRONIC APPARATUS

(75) Inventor: Katsunori Yamazaki, Matsumoto (JP)

(73) Assignee: Epson Imaging Devices Corporation, Azumino-shi (JP)

( * ) Notice: Subject to any disclaimer, the term of this patent is extended or adjusted under 35 U.S.C. 154(b) by 1118 days.

(21) Appl. No.: 11/348,241

(22) Filed: Feb. 7, 2006

(65) Prior Publication Data
US 2006/0192745 A1    Aug. 31, 2006

(30) Foreign Application Priority Data
Feb. 28, 2005    (JP)    ............................. 2005-052684

(51) Int. Cl.
G09G 3/36    (2006.01)
(52) U.S. Cl. .......................................... 345/95; 345/92
(58) Field of Classification Search ............ 345/87–104
See application file for complete search history.

(56) References Cited

U.S. PATENT DOCUMENTS

| | | | | |
|---|---|---|---|---|
| 4,936,656 A | * | 6/1990 | Yamashita et al. | 349/8 |
| 5,117,298 A | * | 5/1992 | Hirai | 345/96 |
| 5,515,072 A | * | 5/1996 | Yanai et al. | 345/92 |
| 5,576,857 A | * | 11/1996 | Takemura | 349/42 |
| 5,952,991 A | * | 9/1999 | Akiyama | 345/98 |
| 5,995,074 A | * | 11/1999 | Kusafuka et al. | 345/90 |
| 6,130,654 A | * | 10/2000 | Hayashi et al. | 345/63 |
| 6,266,038 B1 | * | 7/2001 | Yoshida et al. | 345/92 |
| 6,548,960 B2 | * | 4/2003 | Inukai | 315/169.3 |
| 2001/0019320 A1 | * | 9/2001 | Lee et al. | 345/87 |

(Continued)

FOREIGN PATENT DOCUMENTS

JP    A-06-161390    6/1994

(Continued)

*Primary Examiner*—Chanh Nguyen
*Assistant Examiner*—Robert M Stone
(74) *Attorney, Agent, or Firm*—Oliff & Berridge, PLC

(57) ABSTRACT

An electro-optical device includes pixels that are provided to correspond to intersections of a plurality of rows of scanning lines and a plurality of columns of first data lines, each pixel having an pixel electrode, a common electrode that faces the pixel electrode, a first transistor that is turned on when a corresponding scanning line is selected to supply a data signal from a first data line to the pixel electrode, and a second transistor that is turned on when another scanning line than the corresponding scanning line is selected prior to the corresponding scanning line to supply a data signal from the first data line or a data line different from the first data line to the pixel electrode, a scanning line driving circuit that selects the plurality of rows of scanning lines according to a predetermined sequence, when one scanning line is selected, applies a first voltage so as to turn on the first or second transistor, when the selection ends, applies a second voltage so as to turn off the first and second transistors, and, when a scanning line next to the scanning line is selected, applies a third voltage between the first voltage and the second voltage so as to turn off the first and second transistors, and a data line driving circuit that supplies a data signal according to a grayscale level of a pixel of the selected scanning line through the first data line.

2 Claims, 9 Drawing Sheets

U.S. PATENT DOCUMENTS

| | | | |
|---|---|---|---|
| 2002/0101398 A1* | 8/2002 | Fujita | 345/90 |
| 2003/0052847 A1* | 3/2003 | Okishiro et al. | 345/87 |
| 2005/0017937 A1* | 1/2005 | Chen et al. | 345/87 |
| 2005/0052382 A1* | 3/2005 | Lin et al. | 345/87 |
| 2005/0052393 A1* | 3/2005 | Kobashi | 345/96 |
| 2005/0195139 A1* | 9/2005 | Shih et al. | 345/87 |
| 2006/0192744 A1* | 8/2006 | Yamazaki | 345/100 |

FOREIGN PATENT DOCUMENTS

| | | |
|---|---|---|
| JP | A-07-056544 | 3/1995 |
| JP | A 8-286169 | 11/1996 |
| JP | A-10-221705 | 8/1998 |
| JP | A-10-293287 | 11/1998 |
| JP | A-11-281956 | 10/1999 |
| JP | A-2000-035589 | 2/2000 |
| JP | A-2002-072250 | 3/2002 |

* cited by examiner

ELECTRO-OPTICAL DEVICE, METHOD OF DRIVING ELECTRO-OPTICAL DEVICE, AND ELECTRONIC APPARATUS

BACKGROUND

1. Technical Field

The present invention relates to a technology for preventing a direct-current component from being applied to pixels.

2. Related Art

In an electro-optical device which displays images by using an electro-optical material, such as liquid crystal, in order to prevent degradation of characteristics, the electro-optical material is driven by an alternating current. For example, in an active matrix-type liquid crystal device which uses a thin film transistor as a switching element, a substantially constant voltage is applied to a common electrode facing a plurality of pixel electrodes with liquid crystal therebetween, while a data signal having a voltage corresponding to a grayscale level of a pixel is cyclically polarity-inverted on the basis of a prescribed potential, and then is applied to each pixel electrode.

In such an alternating-current (AC) driving, if an effective voltage value to be applied to the electro-optical material is different according to a positive data signal and a negative data signal, the amount of light emitted from the electro-optical device cyclically changes, thereby causing a flicker. Further, a direct-current component may be applied, and thus the electro-optical material may be degraded. For this reason, a technology for adjusting the voltage of the common electrode (counter electrode) has been suggested, such that, when images are displayed, the cyclic change in the amount of light emitted from the electro-optical device is minimized, that is, the flicker is minimized (for example, see JP-A-8-286169)

However, this technology just performs automatic adjustment such that the flicker is minimized. That is, the above-described technology is, so to speak, a measure, but does not thoroughly improve a problem that effective voltage values of positive and negative polarities to be applied to liquid crystal are different.

SUMMARY

An advantage of some aspects of the invention is that it provides an electro-optical device which can solve a problem caused by different effective voltage values of positive and negative polarities to be applied to liquid crystal, thereby preventing a flicker or application of a direct-current component, a method of driving an electro-optical device, and an electronic apparatus.

According to a first aspect of the invention, an electro-optical device includes pixels that are provided to correspond to intersections of a plurality of rows of scanning lines and a plurality of columns of first data lines, each pixel having an pixel electrode, a common electrode that faces the pixel electrode, a first transistor that is turned on when a corresponding scanning line is selected to supply a data signal from the first data line to the pixel electrode, and a second transistor that is turned on when another scanning line than the corresponding scanning line is selected prior to the corresponding scanning line to supply a data signal from the first data line or a data line different from the first data line to the pixel electrode, a scanning line driving circuit that selects the plurality of rows of scanning lines according to a predetermined sequence, when one scanning line is selected, applies a first voltage so as to turn on the first or second transistor, when the selection ends, applies a second voltage so as to turn off the first and second transistors, and, when a scanning line next to the scanning line is selected, applies a third voltage between the first voltage and the second voltage so as to turn off the first and second transistors, and a data line driving circuit that supplies a data signal according to a grayscale level of a pixel of the selected scanning line through the first data line.

According to this configuration, when the first transistor is turned off, even when the potential of the pixel electrode is changed according to a voltage change direction of the scanning line, the change amount can be compensated by a change amount when the voltage of another different scanning line is changed from the second voltage to the third voltage and a change amount when the voltage of the corresponding scanning line is changed from the second voltage to the third voltage.

In the electro-optical device according to the firs aspect of the invention, the data line driving circuit may divide the voltage of the data signal into a high-level positive voltage and a low-level negative voltage on the basis of a predetermined potential for each predetermined period so as to alternately supply the high-level positive voltage and the low-level positive voltage, and may cause the voltage of the data signal when the first transistor is turned on and the voltage of the data signal when the second transistor is turned on to have the same polarity.

Further, in the electro-optical device according to the first aspect of the invention, it is preferable that the pixel electrode and the common electrode be formed on the same substrate.

On the other hand, the electro-optical device according to the first aspect of the invention may further include a first storage capacitor that capacitively couples the corresponding scanning line and the pixel electrode, and a second storage capacitor that capacitively couples another scanning line and the pixel electrode. In particular, the first storage capacitor may have a laminated structure of the corresponding scanning line, an insulator, and the pixel electrode, and the second storage capacitor may have a laminated structure of another scanning line, an insulator, and the pixel electrode.

In addition, the electro-optical device according to the first aspect of the invention may further include second data lines that pair up with the first data lines. In this case, the data line driving circuit may invert the data signal to be supplied to the first data line on the basis of a predetermined potential and may supply it to the second data line as an inverted data signal. Further, when the second transistor is turned on, the inverted data signal may be supplied from the second data line to the pixel electrode.

When the first and second data lines are provided in each column, it is preferable that the data line driving circuit may divide the voltage of the data signal into a high-level positive voltage and a low-level negative voltage on the basis of the predetermined potential for each predetermined period so as to alternately supply the high-level positive voltage and the low-level positive voltage, and may cause the voltage of the data signal when the first transistor is turned on and the voltage of the inverted data signal when the second transistor is turned on to have the same polarity.

Further, in this case, the electro-optical device according to the first aspect of the invention may further include a first storage capacitor that capacitively couples the first data line and the pixel electrode, and a second storage capacitor that capacitively couples the second data line and the pixel electrode. In particular, the first storage capacitor may have a laminated structure of the first data line, an insulating layer, and the pixel electrode, and the second storage capacitor may have a laminated structure of the second data line, an insulating layer, and the pixel electrode.

Moreover, the invention can be conceptualized as a method of driving an electro-optical device, and an electronic apparatus having an electro-optical device, in addition to an electro-optical device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
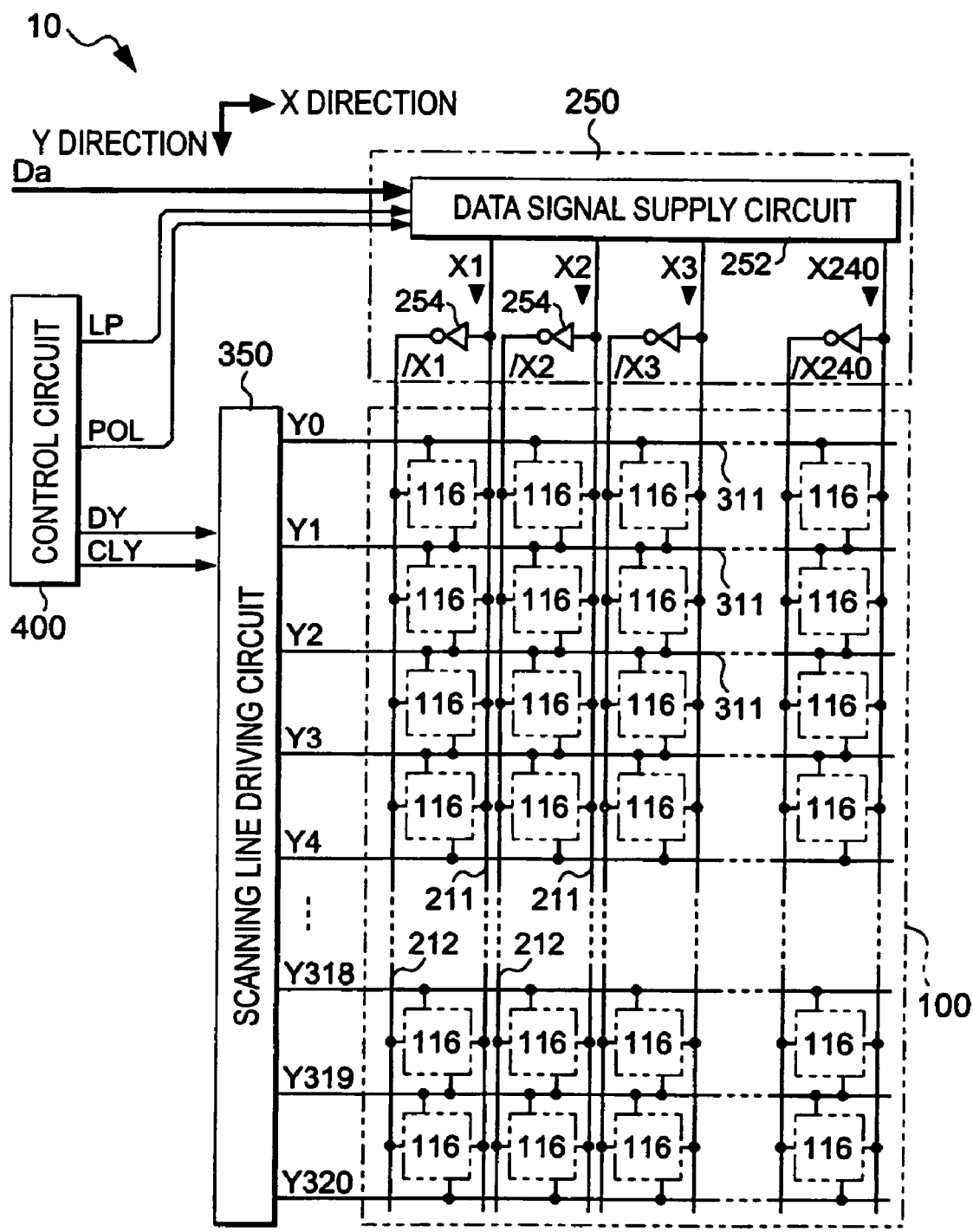
FIG. 1 is a block diagram showing a configuration of an electro-optical device according to an embodiment of the invention.

Hereinafter, embodiments of the invention will be described with reference to the drawings. FIG. 1 is a block diagram showing the configuration of an electro-optical device according to an embodiment of the invention.

As shown in FIG. 1, an electro-optical device 10 includes a liquid crystal panel 100, a data line driving circuit 250, a scanning line driving circuit 350, and a control circuit 400. Among these, in the liquid crystal panel 100, first data lines 211 and second data lines 212 pair up with each other, and the first data lines 211 and the second data lines 212 of 240 columns are provided to extend in a column (Y) direction. Further, scanning lines 311 of 321 rows of 0 to 320 are provided to extend in a row (X) direction.

Pixels 116 are arranged to correspond to intersections of the pairs of the first data lines 211 and the second data lines 212, and the scanning lines 311 of 1st to 320-th rows, excluding an initial zero-th row. Therefore, in this embodiment, the pixels 116 are arranged in a matrix shape of vertical 320 rows×horizontal 240 columns, but it is not intended to limit the invention.

Figure 2A:
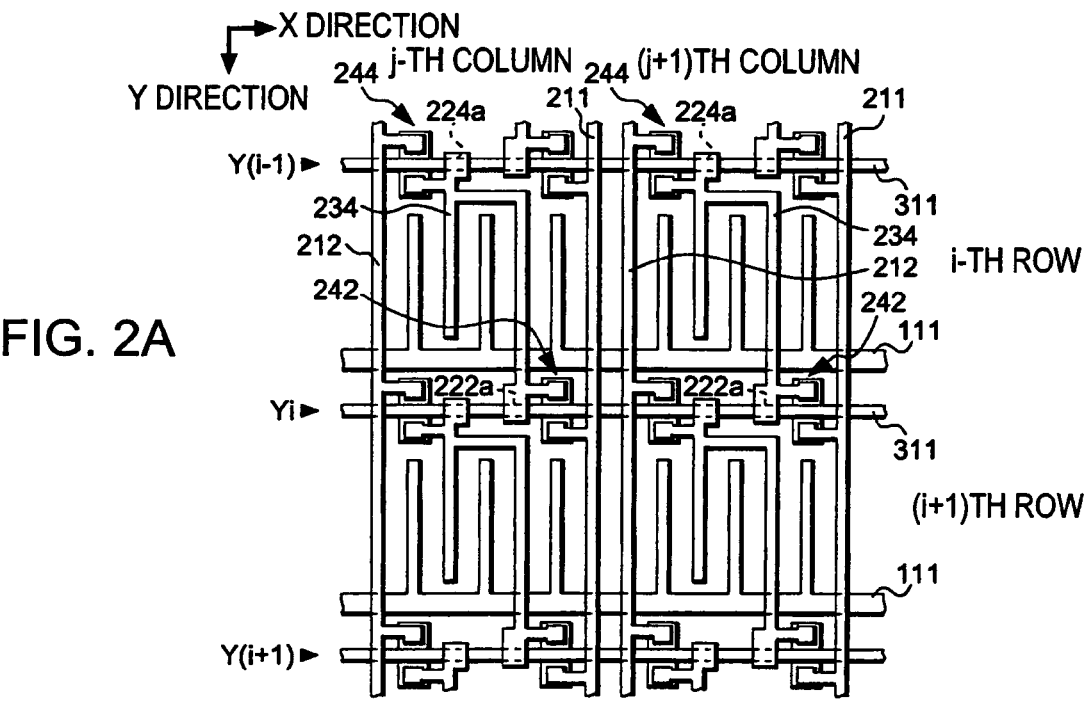
FIG. 2A is a diagram showing a configuration of a pixel in the electro-optical device.
Figure 2B:
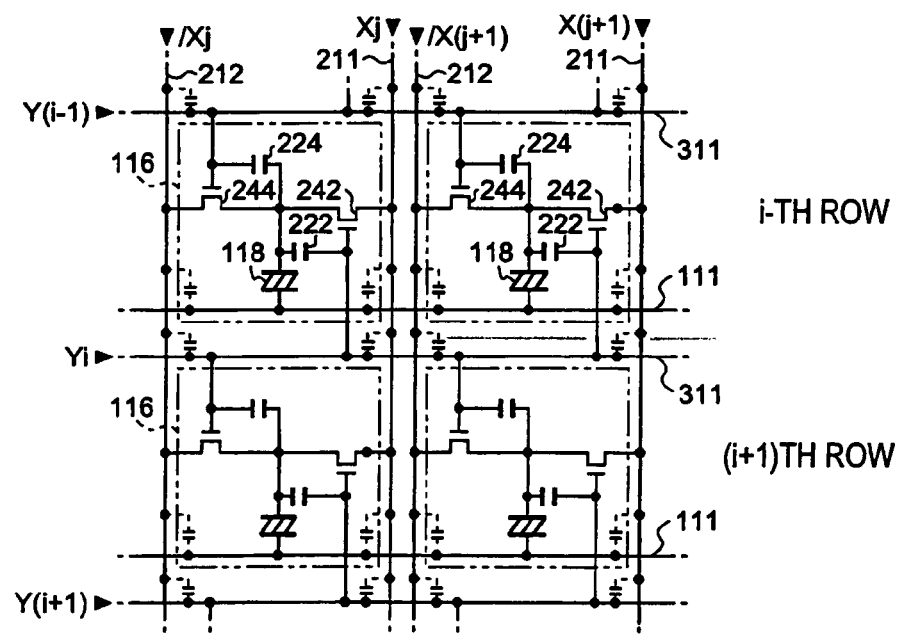
FIG. 2B is a diagram showing a configuration of a pixel in the electro-optical device.

Here, the detailed configuration of the pixel 116 will be described. FIG. 2A is a plan view showing the configuration of the pixel 116, and FIG. 2B is an equivalent circuit diagram showing the configuration of the pixel 116. FIGS. 2A and 2B show the configuration of four pixels of 2×2 corresponding to the intersections of the i-th row and the adjacent (i+1)-th row and the j-th column and the (j+1)-th column.

Moreover, in FIGS. 2A and 2B, (i−1), i, and (i+1) are symbols generally representing the rows of the scanning lines 311, and are integer numbers of 0 to 320. Further, j and (j+1) are symbols generally representing the columns corresponding to the pixels 116, and are integer number of 1 to 240.

As shown in FIG. 2B, each pixel 116 has a pixel capacitor 118, an n-channel first thin film transistor (TFT) 242, an n-channel second TFT 244, a first capacitor 222, and a second capacitor 224.

Here, the configuration of the pixel 116 will be described, paying attention to the i-th row and the j-th column. In the pixel 116 of the i-th row and the j-th column, a gate of the first TFT 242 is connected to the scanning line 311 of the i-th row, and a source thereof is connected to the first data line 211 of the j-th column. On the other hand, in the same pixel 116 of the i-th row and the j-th column, a gate of the second TFT 244 is connected to the scanning line 311 of the (i−1)-th row before one row, and a source thereof is connected to the second data line 212 of the j-th column. A drain of the first TFT 242 and a drain of the second TFT 244 are commonly connected to one end of the pixel capacitor 118. The other end of the pixel capacitor 118 is connected to a common electrode 111 having a constant potential LCcom in a time-variant manner.

Further, one end of the pixel capacitor 118 of the i-th row and the j-th column is capacitively coupled to the scanning line 311 of the i-th row through the first capacitor 222, and is capacitively coupled to the scanning line 311 of the (i−1)-th row before one row through the second capacitor 224.

The liquid crystal panel 100 has an element substrate and a counter substrate, which are bonded to each other with a predetermined gap therebetween. Liquid crystal is filled into the gap. Further, on the element substrate, the pixel electrodes and the common electrode are formed. The element substrate is bonded to the counter substrate such that an electrode formation surface faces the counter substrate. Among these, the electrode formation surface of the element substrate in plan view is shown in FIG. 2A. As apparent from FIG. 2A, the liquid crystal panel 100 is a so-called in-plane switching mode in which a direction of an electric field applied to liquid crystal is in parallel with a surface of one substrate of a pair of substrates.

Specifically, as shown in FIG. 2A, after the first TFTs 242 and the second TFTs 244 are formed on the element substrate, together with the scanning lines 311, the common electrode 111 is formed by patterning a first metal layer through an insulating layer, and the first data lines 211, the second data lines 212, and the pixel electrodes 234 are formed by patterning a second metal layer through an insulating layer.

Among these, each pixel electrode 234 has a substantial U shape having one side along the first data line 211, one side along the second data line 212, and one side along the X direction for connecting both sides. Among these, an extended portion of one side along the first data line 211 is connected to the drain of the first TFT 242, and intersects the scanning line 311 of the i-th row through the insulating layer. For this reason, the intersection has a laminated structure of the scanning line 311, an insulator, and the pixel electrode 234, and thus the first storage capacitor 222a is formed.

Further, of the pixel electrode 234, an extended portion of one side along the second data line 212 is connected to the drain of the second TFT 244, and intersects the scanning line 311 of the (i−1)-th row through the insulating layer. For this reason, in this intersection, the same laminated structure is provided, and thus the second storage capacitor 224a is formed.

Here, referring to FIG. 2B, the first capacitor 222 has synthesized capacitance of a parasitic capacitance component between the gate and the drain of the first TFT 242, and capacitance of the first storage capacitor 222a. Similarly, the second capacitor 224 has synthesized capacitance of a parasitic capacitance component between the gate and the drain of the second TFT 244, and capacitance of the second storage capacitor 224a. Moreover, the capacitance values of the first capacitor 222 and the second capacitor 224 are set to equal to each other.

The common electrode 111 is formed in a comb shape and is disposed to face the pixel electrode 234 with a predetermined distance therebetween. Therefore, in this embodiment, the pixel capacitor 118 is represented by capacitance when the pixel electrode 234 and the common electrode 111 face each other through liquid crystal. In this embodiment, as shown in FIG. 2A, since the common electrode 111 and the pixel electrode 234 intersects each other, capacitance is formed at that portion. For this reason, it can be considered that capacitance is added to pixel capacitance. Moreover, the pixel electrode 234 corresponds to one end of the pixel capacitor 118, and the common electrode 111 corresponds to the other end of the pixel capacitor 118.

In the pixel capacitor 118, an electric field having intensity according to the held voltage is generated in the horizontal (X) direction of the paper in FIG. 2A or 2B, and thus an alignment state of liquid crystal is changed. Accordingly, the amount of light transmitted a polarizer (not shown) becomes the value according to the effective voltage value. For this reason, by the data signal when the scanning line 311 is selected, the voltage held in the pixel capacitor 118 is controlled for each pixel, such that predetermined grayscale display is performed.

Moreover, in this embodiment, for convenience of explanation, if the effective voltage value approximates to zero, a transmission factor of light is minimized, and thus black display is performed. Further, as the effective voltage value becomes large, the amount of transmitted light is increased, and thus white display is performed with the maximum transmission factor. This is referred to as a normally black mode.

Further, in FIG. 2B, the first data line 211 and the second data line 212 individually intersect the scanning line 311 and the common electrode 111 through the insulator, and thus parasitic capacitance is generated at the intersections, as indicated by a dotted line of FIG. 2B.

Returning to FIG. 1, the control circuit 400 controls scanning of the liquid crystal panel 100 by various control signals of a latch pulse LP for defining one horizontal scanning period, a polarity indicating signal POL, a start pulse DY, a clock signal CLY, and the like.

The scanning line driving circuit 350 correspondingly supplies scanning signals Y0, Y1, Y2, Y3, . . . , Y320 to the scanning lines 311 of the zero-th row, the 1st row, the 2nd row, the 3rd row, . . . , and 320-th row.

Specifically, the scanning line driving circuit 350 sequentially receives and shifts the start pulse DY to be supplied at the beginning of a vertical scanning period (1F) according to the rising edge of the clock signal CLY, for example, one cycle of which is one horizontal scanning period (1H), and corresponds the shift signals to the scanning lines 311. And then, when a shift signal becomes the H level in one horizontal scanning period, the scanning line driving circuit 350 selects and applies a voltage with respect to the scanning line 311 corresponding to the shift signal as follows.

That is, the scanning line driving circuit 350 selects a first voltage Vdd over the selected one horizontal scanning period with respect to the scanning line 311 corresponding to the shift signal of the H level, selects a second voltage Vss1 over one and half horizontal scanning period, and then selects a third voltage Vss2. Subsequently, the scanning line driving circuit 350 applies the selected voltage to the scanning line 311.

Here, the voltage Vdd is applied to the gate of the first TFT 242 or the second TFT 244 so as to cause the conduction state of the source and the drain of the TFT (turn on the TFT). On the other hand, the voltage Vss1 or the voltage Vss2 is applied to the gate of the first TFT 242 or the second TFT 244 so as to maintain the non-conduction state of the source and the drain of the TFT (turn off the TFT).

Moreover, in this embodiment, the voltage Vss1 is set lower than the voltage Vss2. Further, the shift signal is not shown.

Next, the data line driving circuit 250 will be described. The data line driving circuit-250 has a data signal supply circuit 252 and inversion circuits 254 corresponding to the columns. Of them, the data signal supply circuit 252 supplies data signals X1, X2, X3, . . . , X240 having voltages according to the grayscale levels of the pixels 116 of the selected scanning line 311 to the first data lines 211 of the 1st column, the 2nd column, the 3rd column, . . . , and the 240-th column. The inversion circuits 254 supplies inverted data signal /X1, /X2, /X3, . . . , /X240, which are obtained by inverting the data signals X, X2, X3, . . . , X240 on the basis of a potential Vc, to the second data lines 212 of the 1st column, the 2nd column, the 3rd column, . . . , the 240th column. Moreover, the symbol '/' represents the inversion.

The data signal supply circuit 252 has storage regions (not shown) corresponding to the matrix arrangement of vertical 320 rows×horizontal 240 columns. In each storage region, grayscale data Da for assigning a grayscale value (brightness) of the corresponding pixel 116 is stored. Further, when a change in display content is generated, grayscale data Da stored in each storage region is rewritten by a high-level device.

The data signal supply circuit 252 reads out grayscale data Da of the pixel 116 of the scanning line 311 selected by the scanning line driving circuit 350 from the storage region, converts a data signal of a voltage according to the grayscale value with a polarity assigned by the polarity indicating signal POL, and supplies the data signal to the corresponding first data line 211. The data signal supply circuit 252 executes the supply operation for the 1st to 240th columns of the selected scanning line 311.

Figure 3:
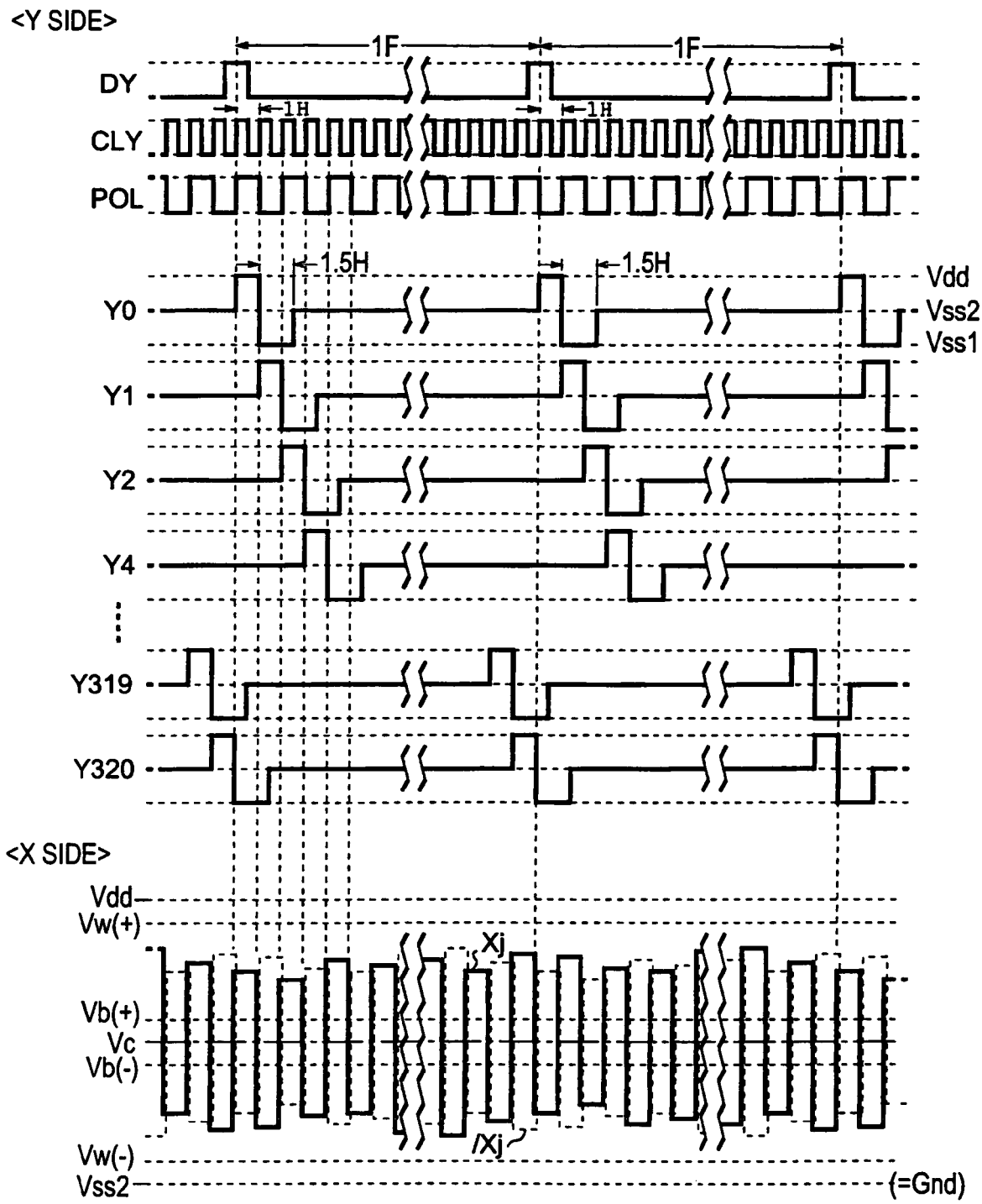
FIG. 3 is a diagram showing scanning signals, data signals, and the like in the electro-optical device.

Here, the polarity indicating signal POL of the H level assigns a positive writing operation and the polarity indicating signal POL of the L level assigns a negative writing operation. As shown in FIG. 3, the polarity of the polarity indicating signal POL is inverted for every one horizontal scanning period (1H). Further, between adjacent one vertical scanning periods (1F), paying attention to the horizontal scanning periods in which the same scanning line 311 is selected, the polarity inversion relationship is also established. As such, the reason for polarity inversion is to prevent liquid crystal from being degraded due to the application of a direct-current component. Further, in this embodiment, the reference of a writing polarity is Vc, and a potential higher than the potential Vc is referred to as a positive polarity and a potential lower than the potential Vc is referred to as a negative polarity.

The data signal to be generated by the data signal supply circuit 252 will be described, paying emphasis on the j-th column. The data signal Xj to be supplied to the first data line 211 of the j-th column is as shown in FIG. 3. That is, if a negative writing operation is instructed in a horizontal scanning period in which the scanning line 311 of the 1st row is selected, the data signal supply circuit 252 sets the voltage of the data signal Xj lower than the potential Vc by the voltage according to the grayscale level of the pixel of the 1st row and the j-th column. If the negative writing operation is instructed to the scanning line 311 of the 1st row, the negative wiring operation is instructed in a horizontal scanning period in which the scanning line 311 of the 2nd row is selected. Accordingly, in the horizontal scanning period in which the scanning line 311 of the 2nd row is selected, the data signal supply circuit 252 sets the voltage of the data signal Xj lower than the potential Vc by the voltage according to the grayscale level of the pixel of the 2nd row and the j-th column. Hereinafter, this operation is repeated.

In the next vertical scanning period (1F), the data signal supply circuit 252 sets the data signal Xj to have the negative polarity in a horizontal scanning period in which the scanning line 311 of an odd-numbered (1, 3, 5, . . . , or 319) row is selected, and sets the data signal Xj to have the positive polarity in a horizontal scanning period in which the scanning line 311 of an even-numbered (0, 2, 4, . . . , or 320) row is selected.

The inverted data signal /Xj has a waveform obtained by inverting the data signal Xj on the basis of the potential Vc, as indicated by a dotted line in FIG. 3.

Here, the voltage relationship in FIG. 3 will be described. A voltage Vw(−) or a voltage Vb(−) is a negative voltage which is applied to the pixel electrode 234 so as to cause the pixel to perform white display of the maximum grayscale level or the minimum grayscale level. On the other hand, a voltage Vw(+) or a voltage Vb(+) is a positive voltage which is applied to the pixel electrode 234 so as to cause the pixel to perform white display of the maximum grayscale level or the minimum grayscale level. The voltage Vw(+) or the voltage Vb(+) is symmetric to the voltage Vw(−) or the voltage Vb(−) on the basis of the voltage Vc.

Further, in this embodiment, since the pixel 116 exists in the 0th row, the data signal supply circuit 252 sets each of the data signals X1 to X240 to the voltage corresponding to a predetermined grayscale value according to the writing polarity in the horizontal scanning period in which the scanning line 311 of the 0th row is selected. For example, the data signal supply circuit 252 sets each of the data signals X1 to X240 to an intermediate value between white of the maximum grayscale level and black of the minimum grayscale level (that is, an intermediate value of the voltage Vw(+) and the voltage Vb(+) at the time of the positive writing operation or an intermediate value of the voltage Vw(−) and the voltage Vb(−) at the time of the negative writing operation) in the horizontal scanning period in which the scanning line 311 of the 0th row is selected.

Moreover, in FIG. 3, the voltage scales in the vertical direction of the scanning signals Y0 to Y320, the data signal Xj (the inverted data signal /Xj), and the like are adjusted for convenience.

Next, the writing operation in the electro-optical device having such a configuration will be described.

Figure 4:
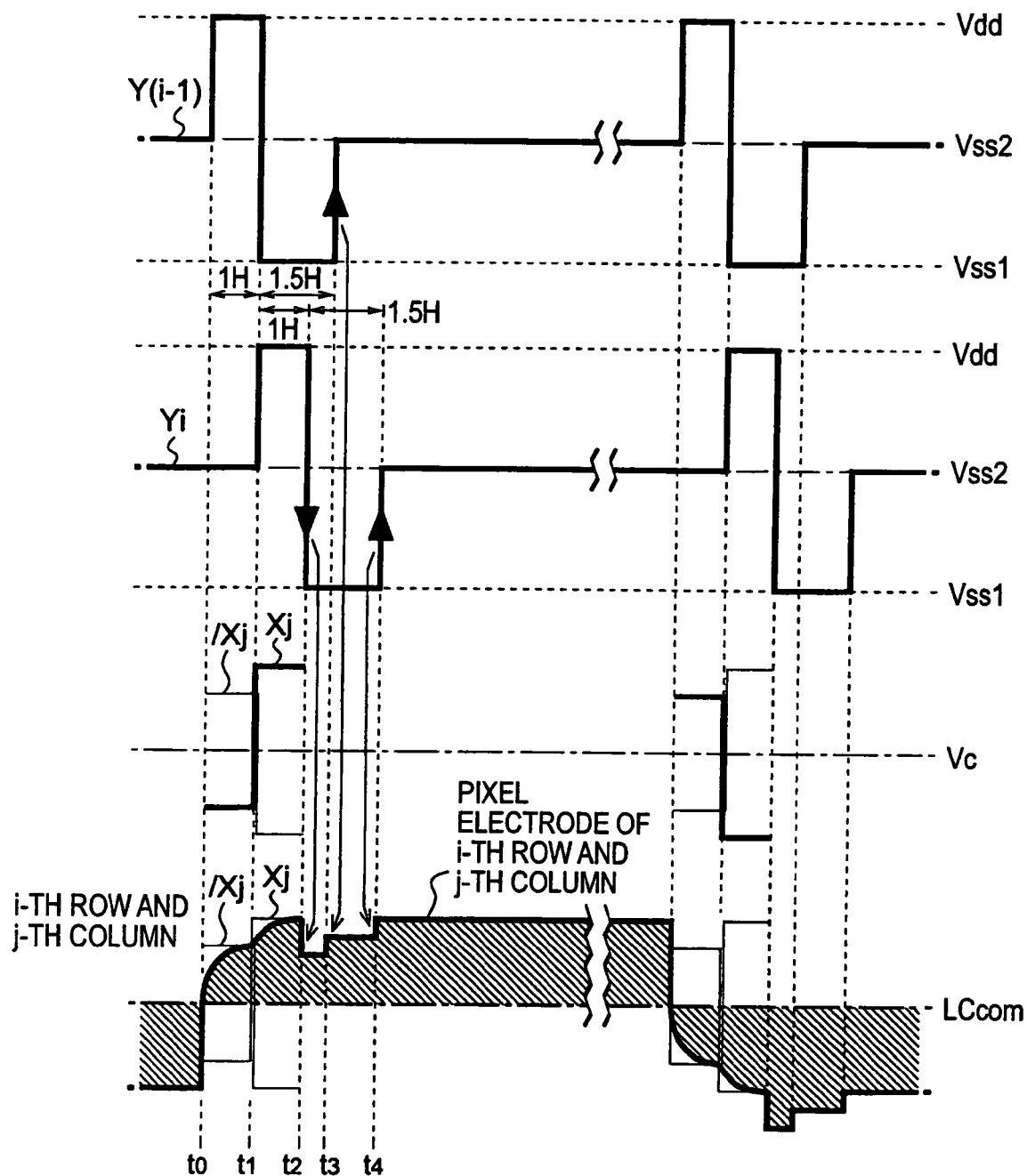
FIG. 4 is a diagram illustrating a writing operation in the electro-optical device.

FIG. 4 is a diagram showing the relationship of the data signal Xj, the inverted data signal /Xj, the scanning signals Yi and Y(i−1) in the writing operation of the pixel of the i-th row and the j-th column.

When the data signal Xj becomes the positive polarity in one horizontal scanning period (timing $t_1$ to $t_2$) in which the scanning line of the i-th row is selected, the data signal Xj becomes the negative polarity in one horizontal scanning period in which the scanning line of the (i−1)-th row before one row is selected ($t_0$ to $t_1$), and the inverted data signal /Xj becomes the positive polarity.

In the horizontal scanning period ($t_0$ to $t_1$), since the scanning signal Y(i−1) before one row is the voltage Vdd corresponding to the H level, in the pixel of the i-th row and the j-th column, the second TFT 244 is turned on. On the other hand, since the scanning signal Yi is the voltage Vss2, in the same pixel of the i-th row and the j-th column, the first TFT 242 is turned off. For this reason, the inverted data signal /Xj supplied to the second data line 212 is applied to the pixel electrode 234 of the i-th row and the j-th column. Specifically, the inverted data signal /Xj of the data signal Xj defining the grayscale level of the pixel of the (i−1)-th row and the j-th column, which has no relation to the pixel of the i-th row and the j-th column, but having the same polarity as that of the data signal Xj when the scanning line of the i-th row is selected, is applied to the pixel electrode 234 of the i-th row and the j-th column. At this time, due to response characteristics of liquid crystal, the voltage of the pixel electrode 234 is relatively slowly changed, not rapidly changed.

Moreover, a hatched region in FIG. 4 represents a potential difference of the pixel electrode 234 and the common electrode 111, that is, a component contributing to the effective voltage value in the pixel capacitor 118.

Subsequently, at the timing $t_1$ that the scanning line 311 of the i-th row is selected, the scanning signal Yi becomes the voltage Vdd corresponding to the H level, and the scanning signal Y(i−1) becomes the voltage Vss1. Accordingly, in the pixel of the i-th row and the j-th column, the first TFT 242 is turned on, and the second TFT 244 is turned off. For this reason, the data signal Xj supplied to the first data line 211, that is, the data signal Xj defining the grayscale level of the pixel of the i-th row and the j-th column, is applied to the pixel electrode 234 of the i-th row and the j-th column. At this time, the voltage of the pixel electrode 234 is relatively slowly changed till the timing $t_2$ that the selection of the scanning line 311 of the i-th row ends. Accordingly, into the pixel capacitor 118 of the i-th row and the j-th column, the voltage according to the grayscale level is written.

However, at the timing $t_2$, when the first TFT 242 is turned off, the potential of the pixel electrode 234 of the i-th row and the j-th column is changed in the voltage change direction of the scanning signal Yi. Specifically, the pixel electrode 234 of the i-th row and the j-th column is capacitively coupled to the scanning line 311 of the i-th row through the first capacitor 222, and thus the potential of the pixel electrode 234 of the i-th row and the j-th column is changed due to an influence of the voltage change in the scanning line 311 of the i-th row. Even when the first storage capacitor 222a by the laminate of the scanning line 311 and the pixel electrode 234 does not exist, the potential change of the pixel electrode is generated by only parasitic capacitance between the gate and the source of the first TFT 242. Accordingly, this is a problem inherent in switching with the TFT (push-down).

In this embodiment, the potential change of the pixel electrode 234 is compensated primarily and secondarily as follows.

First, at a timing $t_3$ that the 1.5H period lapses from the timing $t_1$, the scanning signal Y(i−1) is changed from the voltage Vss1 to the voltage Vss2. The pixel of the i-th row and the j-th column is capacitively coupled to the scanning line 311 of the (i−1)-th row, to which the scanning signal Y(i−1) is supplied, through the second capacitor 224. Therefore, the pixel of the i-th row and the j-th column returns in the change direction from the voltage Vss1 to the voltage Vss2 by the amount according to the capacitance value of the second capacitor 224 (Primary Compensation).

In addition, at a timing $t_4$ that the 1.5H period lapses from the timing $t_2$, the scanning signal Yi is also changed from the voltage Vss1 to the voltage Vss2. The pixel of the i-th row and the j-th column is capacitively coupled to the scanning line 311 of the i-th row, to which the scanning signal Yi is supplied, through the first capacitor 222. Therefore, the pixel of the i-th row and the j-th column returns in the change direction from the voltage Vss1 to the voltage Vss2 by the amount according to the capacitance value of the first capacitor 222 (Secondary Compensation).

Subsequently, the scanning lines 311 of the i-th row and the (i−1)-th row, which are capacitively coupled to the pixel of the i-th row and the j-th column are maintained at the voltage Vss2 until one vertical scanning period 1F lapses, and thus the potential of the pixel electrode 234 of the i-th row and the j-th column is held at the value after compensation (actually, gradually approximates to the potential LCcom of the common electrode 111 due to off leakage of the TFT or the like).

Moreover, at the time of next selection, only by inverting the polarity of the data signal Xj (and the inverted data signal /Xj), the same writing operation is performed.

As such, in this embodiment, even when the potential of the pixel electrode 234 of the i-th row and the j-th column is changed due to push-down just after the corresponding scanning line 311 is selected, the primary compensation and the secondary compensation are immediately performed, and thus the potential change is eliminated. For this reason, in this embodiment, the potential Vc as the reference of the positive polarity and the negative polarity can be substantially fitted to the potential LCcom applied to the common electrode 111. Therefore, the direct-current component can be prevented from being applied to liquid crystal, and a flicker can be easily eliminated.

That is, in a state in which the potential LCcom is fitted to the potential Vc, if alternate writing is performed, due to push-down, the effective voltage value of the pixel electrode 118 for negative writing becomes larger than that for positive writing. Accordingly, in the related art, the potential LCcom of the common electrode 111 needs to be set slightly lower than the potential Vc serving as an amplitude reference of a data signal, such that the effective voltage values of the pixel capacitor 118 for positive writing and negative writing are equal to each-other at the same grayscale level. In this case, however, if automatic or manual adjustment is not executed with high precision, the direct-current component cannot be prevented from being applied to liquid crystal, thereby causing the flicker.

In this embodiment, since the potential change by push-down is compensated, the potential LCcom of the common electrode 111 does not need to be set lower than the potential Vc.

In addition, in this embodiment, paying emphasis on the pixel of the i-th row, before the scanning line 311 of the i-th row is selected, and a voltage according to a target grayscale level is written, when the scanning line 311 of the (i−1)-th row before one row is selected, the pixel electrode 234 of the i-th row is previously precharged with a voltage having the same polarity as that of the voltage according to the target grayscale level. For this reason, time required for write the voltage according to the target grayscale level can be shortened.

Moreover, as described above, as for the primary compensation and the secondary compensation, what is necessary is that the pixel electrode 234 is individually capacitively coupled to the first data line 211 and the second data line 212. Therefore, what is necessary is gate-source parasitic capacitance in the first TFT 242 and the second TFT 244, and thus the first storage capacitor 222a and the second storage capacitor 224a may be not formed by strictly causing the pixel electrode 234 to intersect the scanning line 311.

Further, in this embodiment, the scanning line 311 intersects each of the first data line 211 and the second data line 212 through the insulator, and thus the scanning line 311 is capacitively coupled to each of both data lines. However, in this embodiment, the voltage change of the data signal supplied to the first data line 211 and the voltage change of the inverted data signal supplied to the second data line 212 are opposite to each other and substantially have the same size. Accordingly, in the scanning line 311 to be capacitively coupled, an influence by the voltage change of the data signal and an influence by the voltage change of the inverted data signal cancel each other. Therefore, in this embodiment, waveform distortion of the scanning line 311 by the voltage change of the data signal is prevented.

On the other hand, the common electrode 111 is also capacitively coupled to each of the first data line 211 and the second data line 212, similarly, their influences cancel each other. Accordingly, the potential change of the common electrode 111 is also prevented. For this reason, display quality can be prevented from being lowered by the potential change of the common electrode 111.

Figure 5:
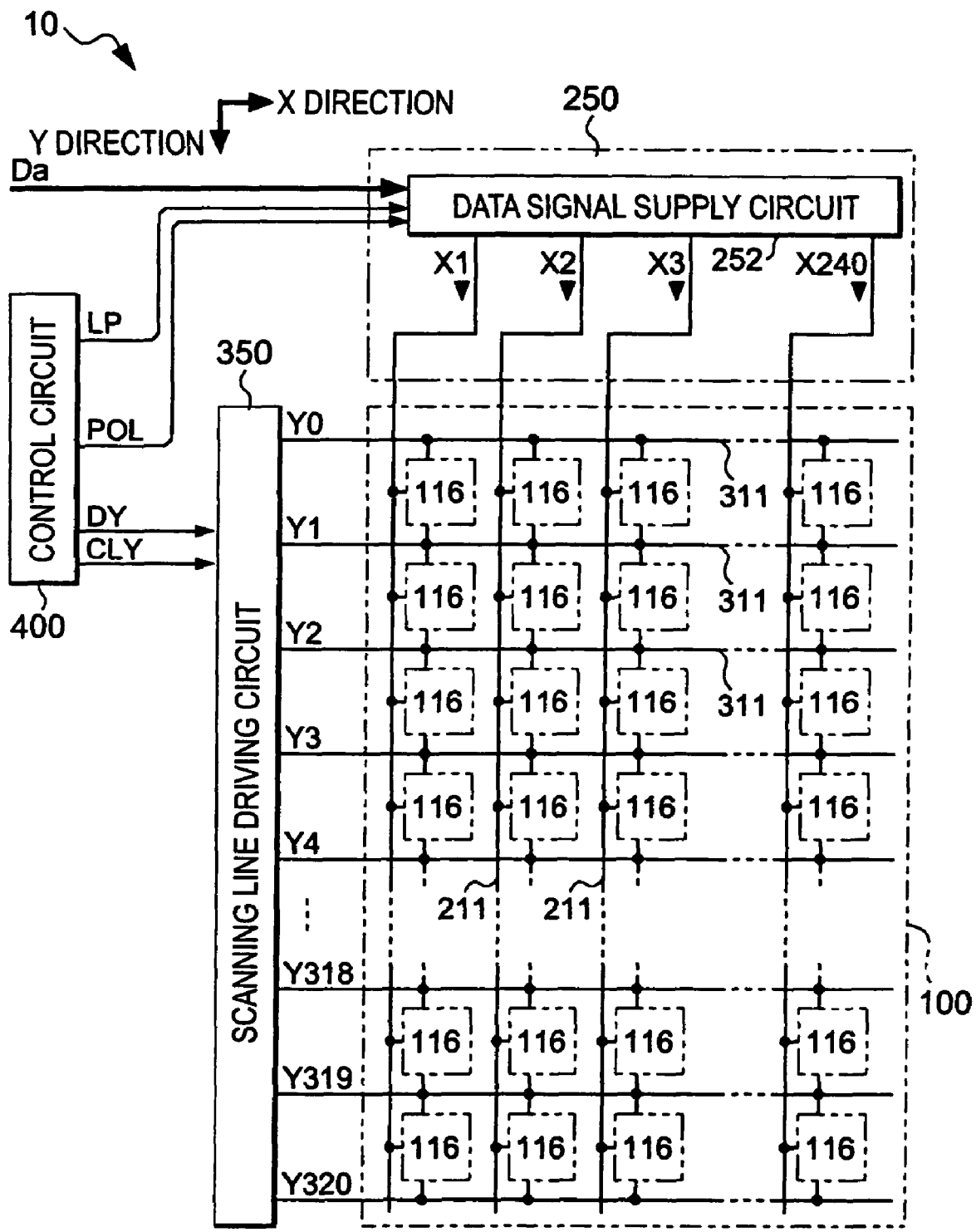
FIG. 5 is a block diagram showing a configuration of an electro-optical device according to another embodiment of the invention.

In the embodiment, the pair of the first data line 211 and the second data line 212 is provided for each column, but the second data line 212 is not necessarily provided in view of reducing an influence by push-down and promoting a short writing time through precharging. For example, as shown in FIG. 5, excluding the second data line 212 and the inversion circuit 254, only the first data line 211 may be provided for each column.

Figure 6A:
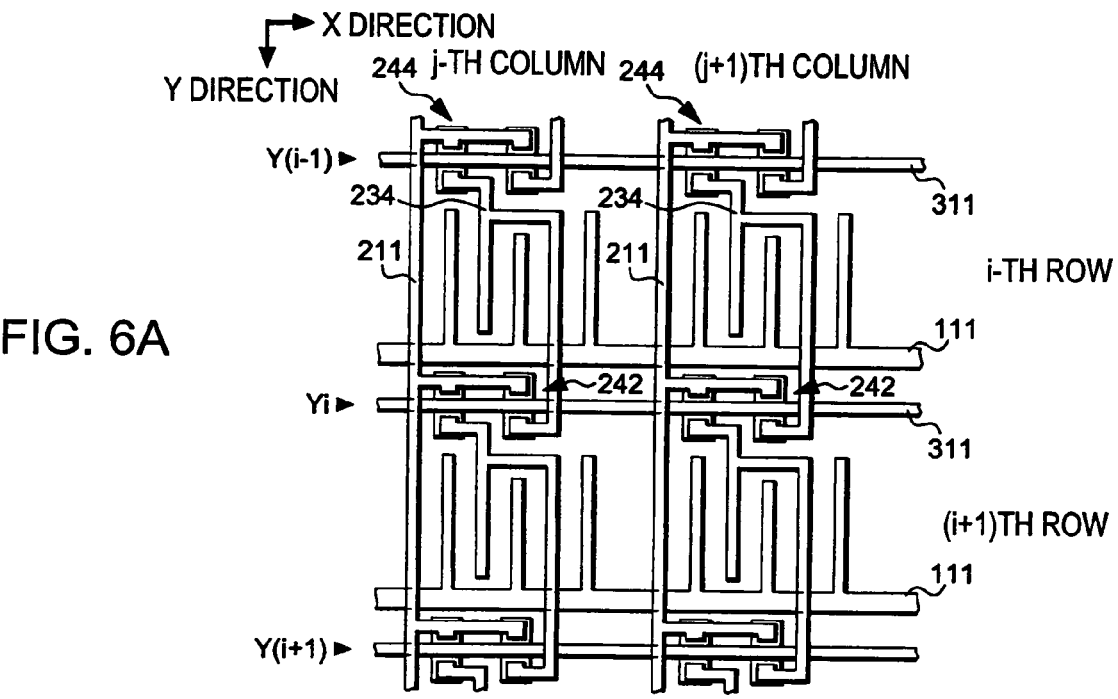
FIG. 6A is a diagram showing a configuration of a pixel in another embodiment.
Figure 6B:
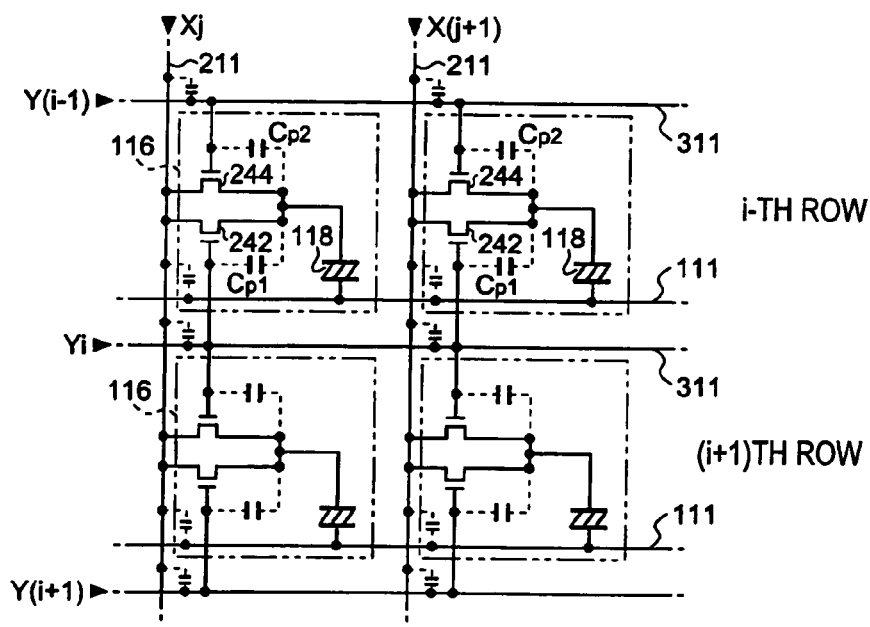
FIG. 6B is a diagram showing a configuration of a pixel in another embodiment.

When only the first data line 211 is provided, as shown in FIGS. 6A and 6B, in the pixel 116, the connection destination of the source of the second TFT 244 may be the first data line 211. That is, in the i-th row and the j-th column, the second TFT 244 is turned on before the selection of the corresponding scanning line of the i-th row so as to precharge the pixel electrode 234 with a voltage having the same polarity. Here, the polarity is more important than the voltage of the data signal when the second TFT 244 is turned on.

Figure 7:
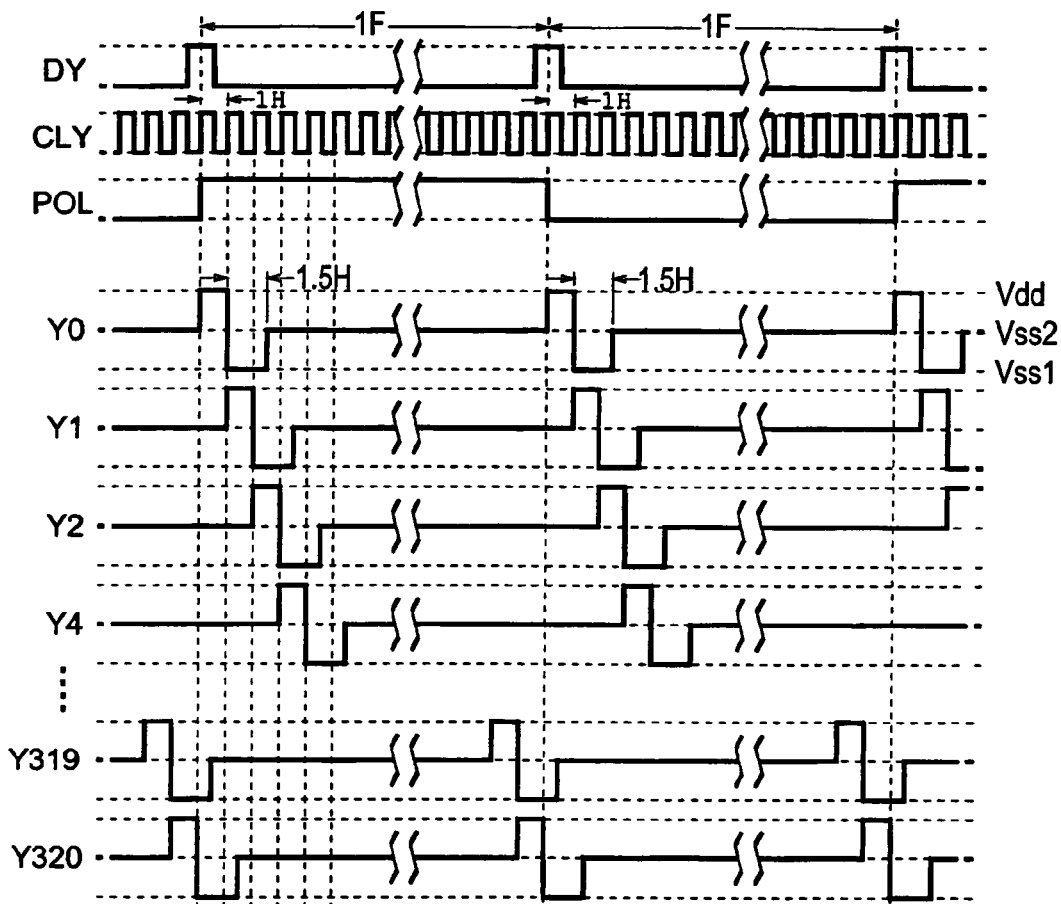
FIG. 7 is a diagram showing scanning signals, data signals, and the like in another embodiment.
Figure 7:
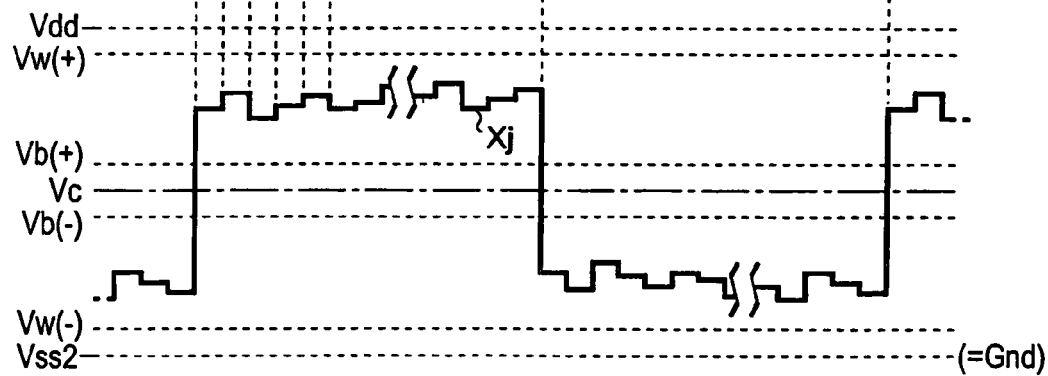

Therefore, in the configuration of the pixel 116 shown in FIG. 6A or 6B, a row inversion mode (see FIG. 3) in which the polarity of the data signal Xj is inverted for every one horizontal scanning period cannot be adopted. And then, as shown in FIG. 7, a surface inversion mode or a column inversion mode in which the polarity of the data signal Xj is the same over one vertical scanning period may be adopted.

However, in the configuration of the pixel 116 shown in FIG. 6A or 6B, the gate of the second TFT 244 may be connected to the scanning line 311 before two rows, not one row, such that the row inversion mode can be achieved.

Further, when only the first data line 211 is provided, in the pixel of the i-th row and the j-th column, the source of the second TFT 244 may be connected to an adjacent first data line 211 of the (j−1)-th column or the (j+1)-th column, not the corresponding j-th column. According to this configuration, even when only the first data line 211 is provided, the gate of the second TFT 244 in the pixel of the i-th row and the j-column is connected to the scanning line 311 of the (i−1)-th row, such that the surface inversion mode or dot inversion mode can be achieved.

In summary, in the pixel of the i-th row and the j-th column, when the scanning line 311 of the i-th row is selected and the first TFT 242 is turned on, the connection destination of the gate of the second TFT 244 and the connection destination of the source of the second TFT 244 can be selected, such that the voltage having the same polarity as that of the data signal applied to the pixel electrode 234 is previously applied to the pixel electrode 234.

Figure 8A:
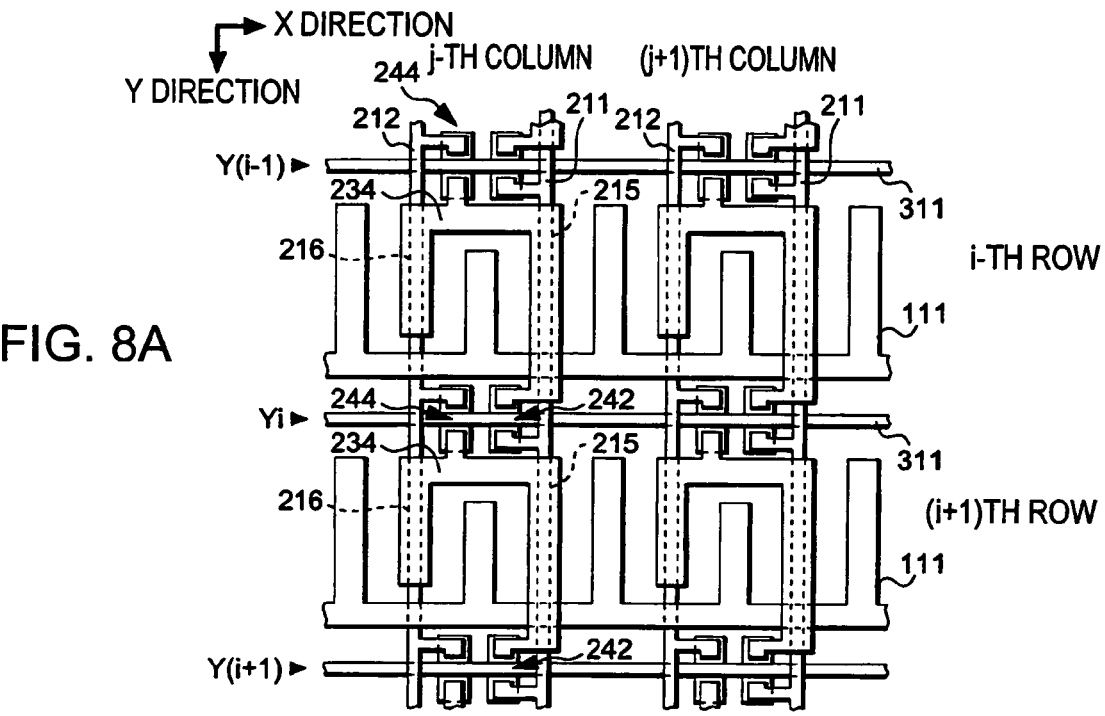
FIG. 8A is a diagram showing a configuration of a pixel of an electro-optical device according to still another embodiment of the invention.
Figure 8B:
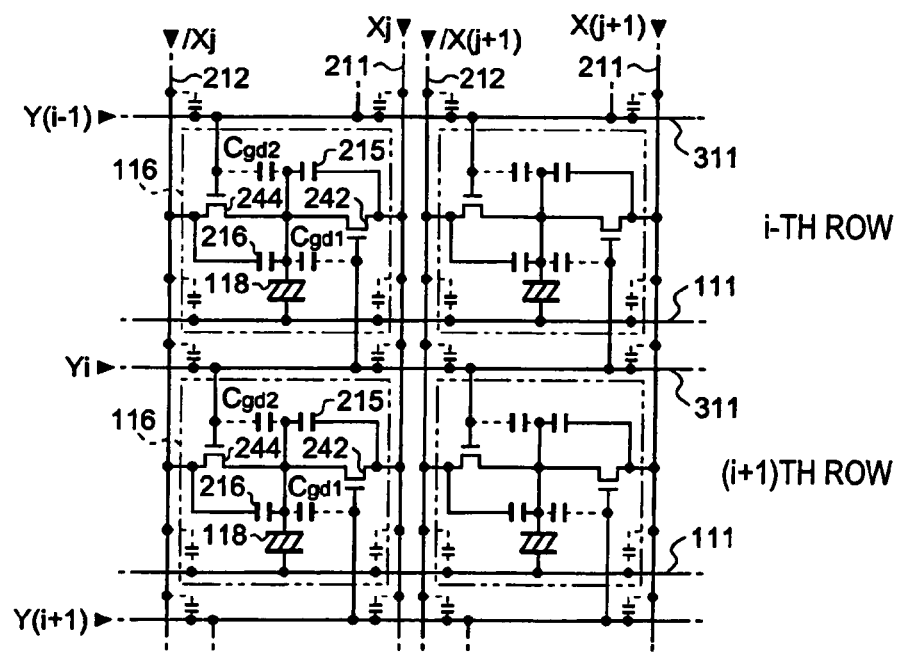
FIG. 8B is a diagram showing a configuration of a pixel of an electro-optical device according to still another embodiment of the invention.

Further, in the pixel 116, as shown in FIG. 8B, a first auxiliary capacitor 215 that electrically connects the pixel electrode 234 and the first data line 211, and a second auxiliary capacitor 216 that electrically connects the pixel electrode 234 and the second data line 212 may be individually provided. The first auxiliary capacitor 215 and the second auxiliary capacitor 216 are formed as follows.

That is, as shown in FIG. 8A, after the first TFTs 242 and the second TFTs 244 are formed on the element substrate, together with the scanning lines 311, the first data lines 211 and the second data lines 212 are formed by patterning a first metal layer through an insulating layer, the common electrode 111 is formed by patterning a second metal layer through an insulating layer, and then the pixel electrodes 234 are formed by patterning a third metal layer through an insulating layer. The configuration of the three metal layers is different from the configuration shown in FIG. 2A.

Here, the pixel electrode 234 has a substantial U shape of one side laminated along the first data line 211, one side laminated along the second data line 212, and one side along the X direction for connecting both sides. Among these, an extended portion of one side laminated along the first data line 211 is connected to the drain of the first TFT 242, and one side along the X direction is connected to the drain of the second TFT 244.

Here, the pixel electrode 234 is laminated along the first data line 211 and the second data line 212, and thus capacitance is formed in each laminated portion. Of them, the laminated portion of the first data line 211 and the pixel electrode 234 is used as the first auxiliary capacitor 215, and the laminated portion of the second data line 212 and the pixel electrode 234 is used as the second auxiliary capacitor 216. Moreover, the capacitance values of the first auxiliary capacitor 215 and the second auxiliary capacitor 216 are substantially set equal to each other.

In FIG. 8B, parasitic capacitance between the gate and the drain of the first TFT 242 is represented by $C_{gd1}$ and parasitic capacitance between the gate and the drain of the second TFT 244 is represented by $C_{gd2}$. Further, the first data line 211 and the second data line 212 individually intersect the scanning line 311 and the common electrode through the insulator. Accordingly, parasitic capacitance is generated by each intersection, as indicated by a dotted line of FIG. 8B.

In the pixel 116 shown in FIG. 8A or 8B, waveform distortion in the scanning line 311 and the potential change of the common electrode 111 can be prevented, and the pixel electrode 234 is hardly influenced by the voltage change of the data signal as follows. That is, in the pixel 116, the pixel electrode 234 is capacitively coupled to the first data line 211 through the first auxiliary capacitor 215, and is capacitively coupled to the second data line 212 through the second auxiliary capacitor 216. Accordingly, an influence by the voltage change of the data signal on the pixel electrode 234 cancels an influence by the inverted data signal on the pixel electrode 234. For this reason, the pixel electrode 234 is hardly influenced by the voltage change of the data signal, and thus the effective voltage value of the pixel capacitor 118 easily approximates to zero. For example, in a normally black mode, when the effective voltage value applied to the pixel capacitor 118 is particularly close to zero, the transmission factor is significantly changed. For this reason, if the effective voltage value of the pixel capacitor 118 can approximate to zero, a brightness range to be displayed is expanded in a dark direction, and thus a contrast ratio can be increased accordingly.

Further, in the configuration, the pixel electrode 234 can be configured to overlap the first data line 211 or the second data line 212, and thus lowering of an aperture ratio does not matter particularly.

Moreover, in the pixel 116 shown in FIG. 8A or 8B, the above-described first and second auxiliary capacitors are not shown, but may be formed by laminating the pixel electrode 234 on the scanning line 311. Further, for the sake of precharging, the connection destination of the gate of the second TFT 244 is configured as described above.

In the embodiment, a period in which each scanning signal becomes the voltage Vss1 is one and half (1.5H) as much as one horizontal scanning period (1H). However, after (or at the same time that) the scanning signal Yi is changed from the voltage Vdd to the voltage Vss1, the scanning signal Y(i−1) may be changed from the voltage Vss1 to the voltage Vss2 in the opposite direction to the change direction from the voltage Vdd to the voltage Vss1, and thus what is necessary is 1H or the like. In this case, however, an influence by push-down is increased, and thus the period in which each scanning signal becomes the voltage Vss1 must not be long.

Although the first TFT 242 and the second TFT 244 are n-channel TFTs in the embodiment or the example, p-channel TFTs can also be used.

Further, in the above-described embodiment, the change cycle of the writing polarity is one frame. This is to prevent the direct-current component from being applied to the pixel capacitor 118. Therefore, as for inversion, a cycle of two or more frames can be adopted.

In addition, in the embodiment, the normally black mode in which black is displayed when the voltage is not applied in the embodiment, but a normally white mode in which white is displayed when the voltage is not applied can be adopted. Moreover, at the time of the normally white mode, the higher the effective voltage value applied to the pixel capacitor 118 is, the darker the pixel is.

Further, the number of grayscale display levels is not particularly limited. In addition, one dot may be constituted by three pixels of R (red), G (green), and B (blue), thereby performing color display.

The liquid crystal panel 100 is not limited to a transmissive type, but a reflective type or a transflective type can be used. In addition, the invention is not limited to the IPS mode, but TN liquid crystal, STN liquid crystal, guest host liquid crystal in which a dye (guest) having anisotropic in absorption of visible light in a long axis direction and a short axis direction is dissolved into liquid crystal (host) of a constant molecular arrangement, and the dye molecules are arranged in parallel with the liquid crystal molecules, or the like can be used. In addition, a vertical alignment (homeotropic alignment) may be provided such that the liquid crystal molecules are vertically arranged with respect to both substrates when the voltage is not applied, while the liquid crystal molecules are horizontally arranged with respect to both substrates when the voltage is applied.

Figure 9:
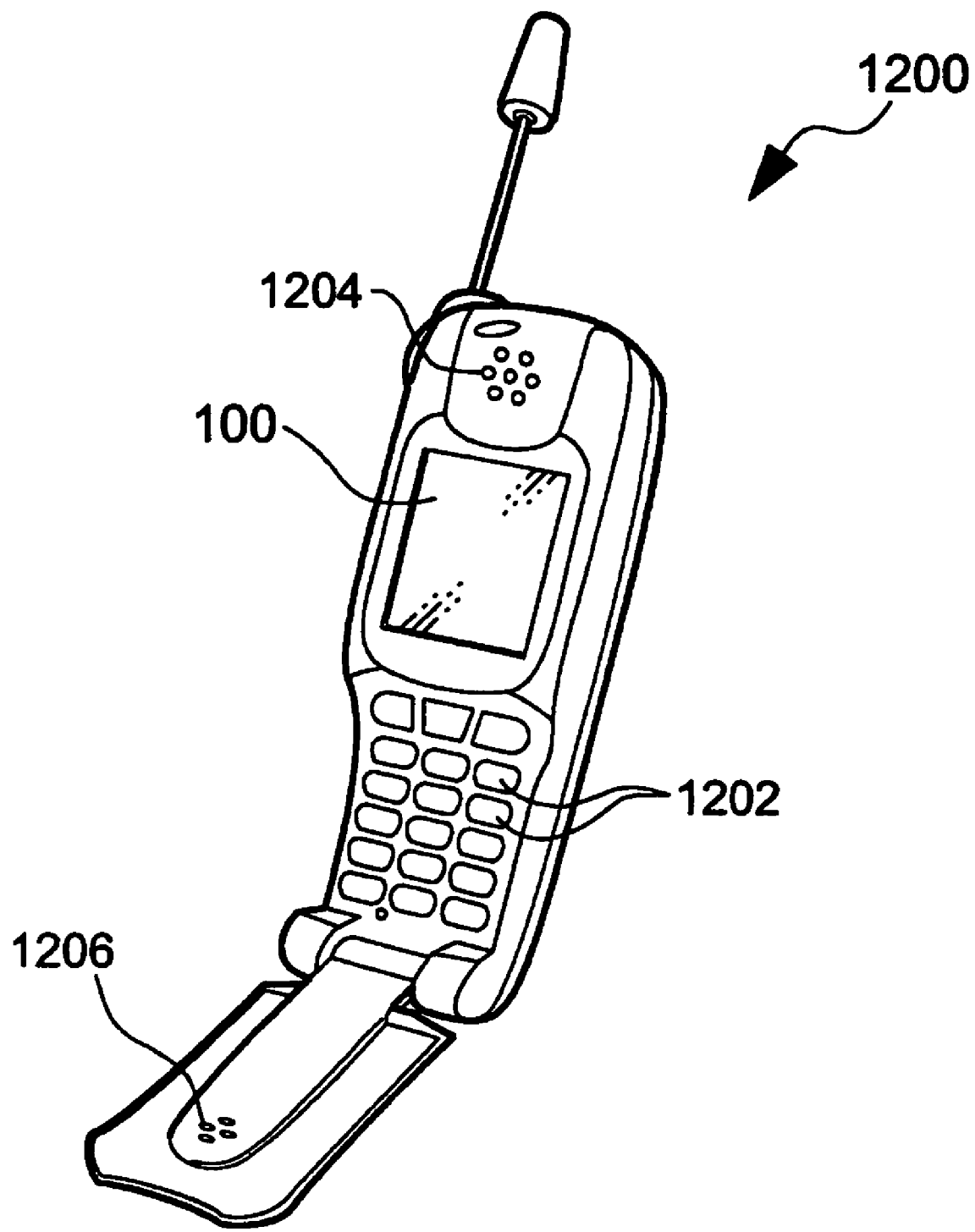
FIG. 9 is a diagram showing a configuration of a cellular phone, which uses the electro-optical device.

Next, an electronic apparatus having the electro-optical device 10 according to the above-described embodiment as a display device will be described. FIG. 9 is a perspective view showing the configuration of a cellular phone 1200 using the electro-optical device 10 according to the embodiment.

As shown in FIG. 9, the cellular phone 1200 has a plurality of operating buttons 1202, a receiver 1204, a transmitter 1206, and the above-described liquid crystal panel 100. Moreover, of the electro-optical device 10, the parts other than the liquid crystal panel 100 are incorporated into the phone, and thus do not appear in appearance.

Moreover, as an electronic apparatus to which the electro-optical device 10 is applied, in addition to the cellular phone shown in FIG. 9, a digital still camera, a notebook personal computer, a liquid crystal television, a viewfinder-type (or monitor-direct-view-type) video recorder, a car navigation device, a pager, an electronic organizer, an electronic calculator, a word processor, a workstation, a video phone, a POS terminal, an apparatus having a touch panel, and the like can be exemplified. Of course, as the display devices of various electronic apparatuses, the above-described electro-optical device 10 can be applied. And then, in any electronic apparatus, display quality can be suppressed from being lowered, and high-quality display can be realized with a simple configuration.

What is claimed is:

1. An electro-optical device comprising:
  pixels that are provided to correspond to intersections of a plurality of rows of scanning lines and a plurality of columns of first data lines, each pixel having:
  a pixel electrode;
  a common electrode that faces the pixel electrode;
  a first transistor that is turned on when a corresponding scanning line is selected to supply a data signal from the first data line to the pixel electrode;
  a second transistor that is turned on when another scanning line other than the corresponding scanning line is selected prior to the corresponding scanning line to supply an inverted data signal from a second data line to the pixel electrode, the gate of the second transistor being directly connected to the scanning line other than the corresponding scanning line;
  a scanning line driving circuit that selects the plurality of rows of scanning lines according to a predetermined sequence, and applies, to a corresponding scanning line, a first voltage so as to turn on the first and second transistors, a second voltage so as to turn off the first and second transistors, and a third voltage between the first voltage and second voltages so as to turn off the first and second transistors;
  when another scanning line other than the corresponding scanning line is selected prior to the corresponding scanning line, the scanning line driving circuit applying the first voltage to the second transistor, and when the selection ends, applying the second voltage to the second transistor;
  when the corresponding scanning line is selected, the scanning line driving circuit applying the first voltage to the first transistor, and when the selection ends, applying the second voltage to the first transistor;
  after the corresponding scanning line is selected, the scanning line driving circuit applying the third voltage to the second transistor;
  after a scanning line following the corresponding scanning line is selected, the scanning line driving circuit applying the third voltage to the first transistor; and
  a data line driving circuit that supplies a data signal according to a grayscale level of a pixel positioned in the selected scanning line through the first data line.

2. A method of driving an electro-optical device, which has pixels that are provided to correspond to intersections of a plurality of rows of scanning lines and a plurality of columns of first data lines, each pixel having a pixel electrode, a common electrode that faces the pixel electrode, a first transistor that is turned on when a corresponding scanning line is selected to supply a data signal from the first data line to the pixel electrode, and a second transistor that is turned on when another scanning line other than the corresponding scanning line is selected prior to the corresponding scanning line to supply an inverted data signal from a second data line to the pixel electrode, the gate of the second transistor being directly connected to the scanning line other than the corresponding scanning line,
  the method of driving the electro-optical device applying, to the first and second transistors, a first voltage so as to turn on the first and second transistor, applying a second voltage so as to turn off the first and second transistors, and applying a third voltage between the first and second voltages so as to turn off the first and second transistors,
  the method comprising:
  selecting the plurality of rows of scanning lines according to a predetermined sequence;
  applying, to a corresponding scanning line, a first voltage so as to turn on the first and second transistors, a second voltage so as to turn off the first and second transistors, and a third voltage between the first and second voltages so as to turn off the first and second transistors;
  when another scanning line other than the corresponding scanning line is selected prior to the corresponding scanning line, applying the first voltage to the second transistor, and when the selection ends, applying the second voltage to the second transistor;
  when the corresponding scanning line is selected, applying the first voltage to the first transistor, and when the selection ends, applying the second voltage to the first transistor;
  after the corresponding scanning line is selected, applying the third voltage to the second transistor;
  after a scanning line following the corresponding scanning line is selected, applying the third voltage to the first transistor; and
  supplying a data signal according to a grayscale level of a pixel positioned in the selected scanning line through the first data line.

* * * * *